(12) United States Patent
Pitman

(10) Patent No.: US 11,945,601 B2
(45) Date of Patent: Apr. 2, 2024

(54) METHODS AND SYSTEMS FOR IN-FLIGHT CHARGING OF AIRCRAFT

(71) Applicant: Brulic Ltd., Hove (GB)

(72) Inventor: James Pitman, London (GB)

(73) Assignee: Brulic Ltd., Hove (GB)

( * ) Notice: Subject to any disclaimer, the term of this patent is extended or adjusted under 35 U.S.C. 154(b) by 509 days.

(21) Appl. No.: 17/279,468

(22) PCT Filed: Sep. 19, 2019

(86) PCT No.: PCT/GB2019/052639
§ 371 (c)(1),
(2) Date: Mar. 24, 2021

(87) PCT Pub. No.: WO2020/065271
PCT Pub. Date: Apr. 2, 2020

(65) Prior Publication Data
US 2021/0362872 A1    Nov. 25, 2021

(30) Foreign Application Priority Data

Sep. 27, 2018   (GB) ...................... 1815772

(51) Int. Cl.
*B64D 39/02*      (2006.01)
*B64D 39/00*      (2006.01)
(Continued)

(52) U.S. Cl.
CPC ............. *B64D 39/02* (2013.01); *B64D 39/00* (2013.01); *B64D 39/06* (2013.01);
(Continued)

(58) Field of Classification Search
CPC ................. B64D 39/02; B64D 39/06
See application file for complete search history.

(56) References Cited

U.S. PATENT DOCUMENTS

| 1,806,833 A | 5/1931 | Ullendorff |
| 1,806,834 A | 5/1931 | Ullendorff |

(Continued)

FOREIGN PATENT DOCUMENTS

| CN | 101395059 | 3/2009 |
| CN | 108536132 | 9/2018 |

(Continued)

OTHER PUBLICATIONS

"Replenishment at Sea", Navy Warfare Publication, U.S. Department of the Navy, Aug. 1996, 440 pgs.

(Continued)

*Primary Examiner* — Joshua J Michener
*Assistant Examiner* — Ryan Andrew Yankey
(74) *Attorney, Agent, or Firm* — Henry Patent Law Firm PLLC

(57) ABSTRACT

A method of operating a supply aircraft for in-flight recharging comprises: transmitting a deploy command signal from a communication unit of the supply aircraft to a communication unit of a receiver aircraft, to cause a line and drogue to deploy from the receiver aircraft; controlling at least one of the supply aircraft and the drogue to engage the drogue with a first end of an electrical cable of the supply aircraft, a second end of the electrical cable being connected to the supply aircraft; and transmitting a return command signal from the communication unit of the supply aircraft to the communication unit of the receiver aircraft, to cause the line and drogue to return to the receiver aircraft with the first end of the electrical cable. The supply aircraft is located behind the receiver aircraft and the deploy command signal is for causing the line and drogue to deploy rearwardly of the receiver aircraft.

20 Claims, 9 Drawing Sheets

(51) Int. Cl.
  *B64D 39/06* (2006.01)
  *H02J 7/00* (2006.01)
  *H02J 50/10* (2016.01)
(52) U.S. Cl.
  CPC ........ *H02J 7/00032* (2020.01); *H02J 7/0045* (2013.01); *H02J 50/10* (2016.02)

(56) References Cited

U.S. PATENT DOCUMENTS

| | | | |
|---|---|---|---|
| 2,023,310 A | 12/1935 | Cobham | |
| 2,123,648 A | 7/1938 | Cobham | |
| 2,193,312 A * | 3/1940 | Cobham | B64D 39/00 244/135 A |
| 2,261,598 A | 11/1941 | Virley | |
| 2,769,604 A | 11/1956 | Hudson et al. | |
| 4,126,162 A | 11/1978 | Clark et al. | |
| 4,905,937 A | 3/1990 | Spotswood et al. | |
| 5,131,438 A | 7/1992 | Loucks | |
| 5,141,178 A | 8/1992 | Alden et al. | |
| 6,604,711 B1 | 8/2003 | Stevens et al. | |
| 7,568,660 B2 | 8/2009 | Howe | |
| 8,905,356 B2 * | 12/2014 | Fernandez Garcia | B64D 39/02 244/135 A |
| 9,334,062 B2 * | 5/2016 | Degiorgis | G01S 19/54 |
| 10,029,803 B1 * | 7/2018 | Larsen | B64C 39/024 |
| 10,267,439 B2 * | 4/2019 | Pryce | H01R 13/005 |
| 11,124,314 B2 * | 9/2021 | Tillotson | G01S 5/0231 |
| 2002/0074455 A1 | 6/2002 | Ollar | |
| 2004/0065383 A1 | 4/2004 | Jones et al. | |
| 2006/0102791 A1 | 5/2006 | Adelson | |
| 2007/0181748 A1 | 8/2007 | Mouskis | |
| 2009/0184205 A1 | 7/2009 | Matheny | |
| 2010/0072320 A1 * | 3/2010 | Bartov | B64D 39/02 244/135 A |
| 2010/0276537 A1 | 11/2010 | Kutzmann et al. | |
| 2013/0000927 A1 | 1/2013 | Meier et al. | |
| 2014/0346279 A1 | 11/2014 | Foo et al. | |
| 2015/0083864 A1 | 3/2015 | Black et al. | |
| 2015/0251769 A1 | 9/2015 | De La Fuente Lopez et al. | |
| 2015/0336677 A1 * | 11/2015 | Smaoui | H02J 7/0014 320/109 |
| 2016/0031564 A1 | 2/2016 | Yates | |
| 2016/0195447 A1 | 7/2016 | Nance | |
| 2017/0275016 A1 | 9/2017 | Guerquin | |
| 2019/0237999 A1 * | 8/2019 | Tillotson | H02J 50/12 |
| 2019/0315479 A1 | 10/2019 | Tillotson | |
| 2021/0362871 A1 | 11/2021 | Pitman | |

FOREIGN PATENT DOCUMENTS

| | | |
|---|---|---|
| EP | 0472927 | 3/1992 |
| EP | 0472927 A1 * | 3/1992 |
| EP | 3680178 | 7/2020 |
| GB | 462818 | 3/1937 |
| GB | 2373488 | 9/2002 |
| WO | 2008045116 | 4/2008 |
| WO | 2020065247 | 4/2020 |
| WO | 2020065271 | 4/2020 |
| WO | 2020065322 | 4/2020 |

OTHER PUBLICATIONS

USPTO, Non-Final Office Action dated Sep. 27, 2022, in U.S. Appl. No. 16/754,894, 32 pgs.
"Unit Load Devices", Qantas, Dec. 25, 2017, 38 pgs.
UKIPO, Search Report dated Mar. 15, 2019, in GB 1815772.7, 1 pg.
WIPO, International Search Report dated Dec. 20, 2019, in PCT/GB2019/052639, 4 pgs.

* cited by examiner

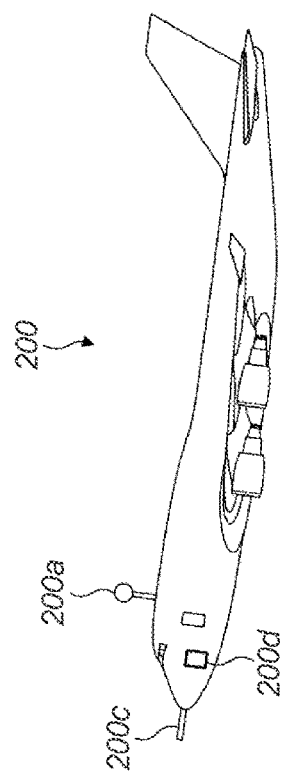
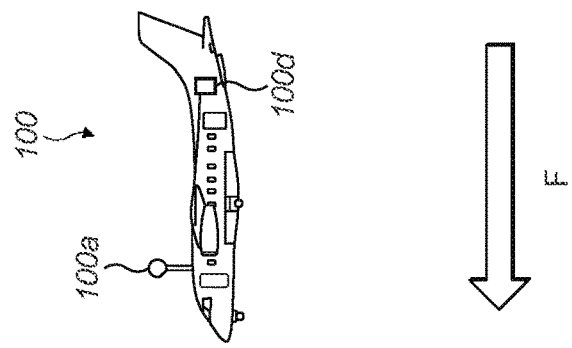
FIG. 1

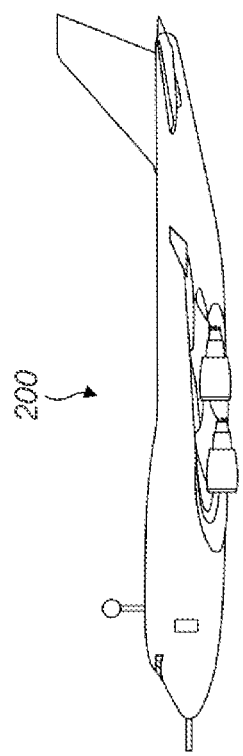
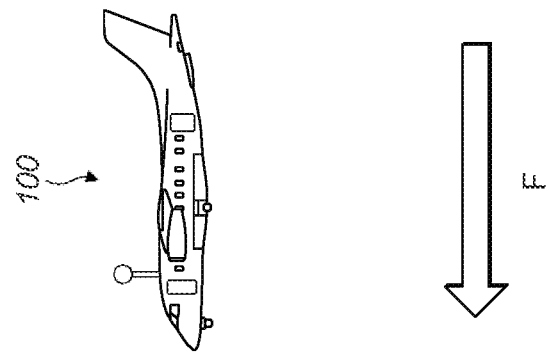
FIG. 2

METHODS AND SYSTEMS FOR IN-FLIGHT CHARGING OF AIRCRAFT

This application is a 371 national stage entry of International Application No. PCT/GB2019/052639, filed Sep. 19, 2019, and entitled "Methods and Systems for In-flight Charging of Aircraft," which claims priority to GB1815772.7 filed Sep. 27, 2018, the contents of which are hereby incorporated herein by reference in their entirety.

BACKGROUND OF THE INVENTION

The present invention relates to methods and systems for in-flight (re)charging of aircraft.

In-flight refueling (IFR) involves the transfer of fuel (typically a liquid fuel, e,g, kerosene) from one aircraft (the "tanker") to another aircraft (the "receiver") during flight. IFR (also known as aerial refueling or air-to-air refueling) has become a well-established methodology used to extend the range or loiter time (or increase take-off payload) of military aircraft. Typically the tanker is based on an airliner which has been specially redesigned or converted for refueling operations, while the receiver is usually a fighter aircraft, or possibly a bomber or reconnaissance aircraft.

Experimentation with IFR began in the 1920s and continued through the 1930s. Early systems used a grappling method, whereby the crew of a supply aircraft would unreel a fuel hose from the tanker and the crew of a receiver aircraft would grapple the hose in the air, reel it in and attach it to the receiver's fuel tank. In a variation on this method a cable was thrown from a receiver aircraft and was grappled in the air by the crew of a supply aircraft. The tanker crew drew the free end of the cable back into the tanker and attached it to a fuel hose. The receiver crew then pulled the cable (and the hose attached thereto) back to the receiver in order to connect the hose to the receiver's fuel tank. With the hose connected, the tanker ascended above the receiver in order to supply the fuel under gravity.

By the 1950s IFR had become well-established for military aircraft and today there are two different methods in widespread use: flying boom and probe-and-drogue.

The flying boom is attached at the rear of the tanker and comprises a rigid, telescopic and articulated tube having a nozzle at one end. The boom includes flight control surfaces which can be moved to create aerodynamic forces for controlling the boom in flight. For refueling the receiver is firstly positioned in formation behind the tanker, which flies straight and level. A boom operator on-board the tanker then extends the boom and adjusts the flight control surfaces so that the nozzle is guided into a receptacle on the following receiver. Once the nozzle is securely inserted and locked in the receptacle, fuel is pumped from the tanker to the receiver. When the desired amount of fuel has been transferred, the nozzle is disconnected from the receptacle by the boom operator and the two aircraft are then free to break formation.

In the probe-and-drogue system the supply aircraft is equipped with a flexible hose. The drogue (or basket), which resembles a shuttlecock, is attached to an end of the hose. The other end is attached to a hose drum unit (HDU), the hose being reeled on the HDU when not in use. The probe is a rigid, tubular arm which extends from the nose or fuselage of the receiver aircraft. The probe is typically retractable so that it can be stored away when not in used.

For refueling the hose and drogue are trailed out behind and below the tanker while the tanker flies straight and level. The hose is stabilized in flight by the shuttlecock form of the drogue. The pilot of the receiver positions the receiver behind and below the tanker. The pilot then flies the receiver aircraft toward the tanker so that the extended probe is inserted into the funnel-shaped drogue. When the probe is properly engaged with the drogue, fuel is pumped from the tanker to the receiver. A motor in the HDU controls the hose to be retracted and extended as the receiver aircraft moves fore and aft, thereby maintaining the correct amount of tension to prevent undesirable bending of the hose. When the desired amount of fuel has been transferred, the probe is disconnected from the drogue and the two aircraft can break formation.

Unlike the flying boom system, the probe-and-drogue system has no need for a dedicated boom operator on-board the supply aircraft. Also the tanker design is simpler. Furthermore the tanker can be provided with multiple hoses and drogues so that two or more receiver aircraft can be fueled simultaneously, whereas the flying boom system can fuel only one receiver aircraft at a time. On the other hand, the fuel flow rate of the probe-and-drogue system is lower than that of the flying boom system, meaning longer fueling times. In addition the probe-and-drogue system is more susceptible to adverse weather conditions and turbulence. Furthermore the probe-and-drogue system requires all receiver aircraft to be fitted with a refueling probe.

While IFR has become routine for military aircraft, it has not been applied to any significant extent in commercial aircraft operations, despite huge potential benefits in terms of cost-savings due to reduced fuel consumption. The main reason is the high level of skill needed by the pilot of the receiver aircraft to safely control the receiver during the hazardous fueling operation. This requires specialized and regular training which is not practical for commercial airline crews.

Furthermore some elements of the IFR systems themselves seem unsuitable for use with airliners as receiver aircraft. For example, the kind of boom used in the flying boom system of a military aircraft would be too short to provide safe separation between the tanker and the receiver when the receiver is a large airliner.

For these reasons at least it seems the kinds of IFR systems used by military operators are unsuitable for use with large civil aircraft, and would be unlikely to receive safety certification for commercial airline operations.

It would therefore be desirable to provide methods and systems for in-flight (re)fueling of large civil aircraft. Furthermore, it is envisaged that the propulsion systems of future civil aircraft will be powered by electrical energy, rather than (or perhaps in conjunction with) energy extracted from liquid fuels. The present invention therefore seeks to provide methods and systems for in-flight electrical (re)charging of large civil aircraft.

SUMMARY OF THE INVENTION

According to an aspect of the invention, there is provided a method of operating a supply aircraft for in-flight recharging, comprising: transmitting a deploy command signal from a communication unit of the supply aircraft to a communication unit of a receiver aircraft, to cause a line and drogue to deploy from the receiver aircraft; controlling at least one of the supply aircraft and the drogue to engage the drogue with a first end of an electrical cable of the supply aircraft, a second end of the electrical cable being connected to the supply aircraft; and transmitting a return command signal from the communication unit of the supply aircraft to the communication unit of the receiver aircraft, to cause the line and drogue to return to the receiver aircraft with the first end of the electrical cable, wherein the supply aircraft is located behind the receiver aircraft and the deploy command signal is for causing the line and drogue to deploy rearwardly of the receiver aircraft.

The method of operating a supply aircraft may further comprise activating an electrical circuit of the supply aircraft to transfer electrical energy from the supply aircraft to the receiver aircraft via the electrical cable.

The method of operating a supply aircraft may further comprise transmitting a further return command signal from the communication unit of the supply aircraft to the communication unit of the receiver aircraft, to cause the line and drogue and first end of the electrical cable to return to the supply aircraft.

The method of operating a supply aircraft may further comprise: causing the drogue to disengage from the first end of the electrical cable; and transmitting a further return command signal from the communication unit of the supply aircraft to the communication unit of the receiver aircraft, to cause the line and drogue to return to the receiver aircraft.

Controlling the supply aircraft to engage the drogue with the first end of the electrical cable may comprise manoeuvring the supply aircraft to guide the first end of the electrical cable into the drogue.

Controlling the drogue to engage the drogue with the first end of the electrical cable may comprise sending control signals from the communication unit of the supply aircraft to cause adjustment of aerodynamic control surfaces of the drogue to guide the drogue onto the first end of the electrical cable.

The method of operating a supply aircraft may further comprise: after causing the line and drogue to return to the receiver aircraft with the first end of the electrical cable, extending the electrical cable from the supply aircraft and controlling the supply aircraft so as to increase a separation distance between the supply aircraft and the receiver aircraft; and before causing the line and drogue and first end of the electrical cable to return to the supply aircraft, controlling the supply aircraft so as to reduce the separation distance between the supply aircraft and the receiver aircraft and retracting the extended electrical cable to the supply aircraft.

The method of operating a supply aircraft may further comprise: controlling at least one of the supply aircraft and the drogue to engage the drogue with a first end of a fuel hose of the supply aircraft, a second end of the fuel hose being connected to the supply aircraft; and returning the line and drogue to the receiver aircraft with the first end of the fuel hose.

The method of operating a supply aircraft may further comprise activating a fuel pump of the supply aircraft to transfer fuel from the supply aircraft to the receiver aircraft via the fuel hose.

The method of operating a supply aircraft may further comprise transmitting a further return command signal from the communication unit of the supply aircraft to the communication unit of the fuel receiver aircraft, to cause the line and drogue and first end of the fuel hose to return to the supply aircraft.

The method of operating a supply aircraft may further comprise: causing the drogue to disengage from the first end of the fuel hose; and transmitting a further return command signal from the communication unit of the supply aircraft to the communication unit of the receiver aircraft, to cause the line and drogue to return to the receiver aircraft.

Controlling the supply aircraft to engage the drogue with the first end of the fuel hose may comprise manoeuvring the supply aircraft to guide the first end of the fuel hose into the drogue.

Controlling the drogue to engage the drogue with the first end of the fuel hose may comprise sending control signals from the communication unit of the supply aircraft to cause adjustment of aerodynamic control surfaces of the drogue to guide the drogue onto the first end of the fuel hose.

The method of operating a supply aircraft may further comprise: after returning the line and drogue to the receiver aircraft with the first end of the fuel hose, extending the fuel hose from the supply aircraft and controlling the supply aircraft so as to increase the separation distance between the supply aircraft and the receiver aircraft; and before causing the line and drogue and first end of the fuel hose to return to the supply aircraft, controlling the supply aircraft so as to reduce the separation distance between the supply aircraft and the receiver aircraft and retracting the extended fuel hose to the supply aircraft.

Thus the inventive method is appropriate for both electrical recharging and liquid refueling of a receiver aircraft having a "hybrid" (electrical and liquid fuel) propulsion system.

According to another aspect of the invention, there is provided a method of operating a receiver aircraft for in-flight recharging, comprising: acquiring in a communication unit of the receiver aircraft a deploy command signal from a communication unit of a supply aircraft; in response to the deploy command signal, controlling a line and drogue to deploy from the receiver aircraft to enable the drogue to be engaged with a first end of an electrical cable of the supply aircraft, a second end of the electrical cable being connected to the supply aircraft; acquiring in the communication unit of the receiver aircraft a return command signal from the communication unit of the supply aircraft; and in response to the return command signal, controlling the line and drogue to return to the receiver aircraft with the first end of the electrical cable, wherein the supply aircraft is located behind the receiver aircraft and the line and drogue are controlled to deploy rearwardly of the receiver aircraft.

The method of operating a receiver aircraft may further comprise: controlling the line and drogue to deploy from the receiver aircraft to enable the drogue to be engaged with a first end of a fuel hose of the supply aircraft, a second end of the fuel hose being connected to the supply aircraft; and controlling the line and drogue to return to the receiver aircraft with the first end of the fuel hose.

According to another aspect of the invention, there is provided a method of operating aircraft for in-flight recharging, comprising: transmitting a deploy command signal from a communication unit of a supply aircraft; acquiring the deploy command signal in a communication unit of a receiver aircraft; in response to the deploy command signal, controlling a line and drogue to deploy from the receiver aircraft; controlling at least one of the supply aircraft and the drogue to engage the drogue with a first end of an electrical cable of the supply aircraft, a second end of the electrical cable being connected to the supply aircraft; transmitting a return command signal from the communication unit of the supply aircraft; acquiring the return command signal in the communication unit of the receiver aircraft; and in response to the return command signal, controlling the line and drogue to return to the receiver aircraft with the first end of the electrical cable, wherein the supply aircraft is located behind the receiver aircraft and the line and drogue are controlled to deploy rearwardly of the receiver aircraft.

The method of operating aircraft for in-flight recharging may further comprise: controlling at least one of the supply aircraft and the drogue to engage the drogue with a first end of a fuel hose of the supply aircraft, a second end of the fuel hose being connected to the supply aircraft; and controlling the line and drogue to return to the receiver aircraft with the first end of the fuel hose.

According to another aspect of the invention, there is provided a system for a supply aircraft for in-flight recharging, comprising: an electrical cable comprising a first end for engagement with a drogue of a receiver aircraft and a second end for connection to the supply aircraft; and a communication unit configured to transmit command signals to a communication unit of the receiver aircraft, wherein the command signals comprise: a deploy command signal, for causing the receiver aircraft to deploy a line and drogue rearwardly to the supply aircraft behind the receiver aircraft to enable the drogue to be engaged with the first end of the electrical cable; and a return command signal, for causing the line and drogue to return to the receiver aircraft with the first end of the electrical cable.

The first end of the electrical cable may comprise an electrical connector for direct coupling with an electrical connector of the receiver aircraft.

The first end of the electrical cable may comprise an inductive coil for inductive coupling with an inductive coil of the receiver aircraft.

The electrical connector/inductive coil of the first end of the electrical cable may comprise a magnetic device for attracting the electrical connector/inductive coil of the receiver aircraft thereto by magnetic force. The magnetic device may comprise an electromagnetic device.

The system for a supply aircraft may further comprise a fuel hose comprising a first end for engagement with the drogue of the receiver aircraft and a second end for connection to the supply aircraft.

According to another aspect of the invention, there is provided a system for a receiver aircraft for in-flight recharging, comprising: a line and drogue for engagement with a first end of an electrical cable of a supply aircraft, a second end of the electrical cable being connected to the supply aircraft; a communication unit configured to acquire deploy and return command signals from a communication unit of the supply aircraft; and a controller configured to: in response to the deploy command signal, deploy the line and drogue rearwardly to the supply aircraft behind the receiver aircraft to enable the drogue to be engaged with the first end of the electrical cable; and in response to the return command signal, return the line and drogue to the receiver aircraft with the first end of the electrical cable.

The drogue may comprise adjustable aerodynamic control surfaces for guiding the drogue for engagement with the first end of the electrical cable in flight.

The drogue may further comprise a communication unit for receiving control signals from the communication unit of the supply aircraft for adjusting the aerodynamic control surfaces.

The drogue may further comprise a dedicated electrical power source for powering the adjustable aerodynamic control surfaces.

The line may comprise a conductive material for transmitting electrical power from the receiver aircraft to the drogue for powering the adjustable aerodynamic control surfaces.

The drogue may comprise a first magnetic device for attracting the first end of the electrical cable to the drogue by magnetic force. The first magnetic device may comprise an electromagnetic device.

The drogue may further comprise a dedicated electrical power source for powering the electromagnetic device.

The line may comprise a conductive material for transmitting electrical power from the receiver aircraft to the drogue for powering the electromagnetic device.

The system for a receiver aircraft may further comprise an electrical connector for direct coupling with an electrical connector of the electrical cable of the supply aircraft.

The system for a receiver aircraft may further comprise an inductive coil for inductive coupling with an inductive coil of the electrical cable of the supply aircraft.

The electrical connector/inductive coil of the system may further comprise a second magnetic device for attracting the electrical connector/inductive coil of the electrical cable of the supply aircraft thereto by magnetic force. The second magnetic device may comprise an electromagnetic device.

The system for a receiver aircraft may further comprise a fuel inlet for connection with an end of a fuel hose of the supply aircraft.

According to another aspect of the invention, there is provided a system for in-flight recharging, comprising: a receiver aircraft comprising: a line and drogue; a communication unit configured to acquire deploy and return command signals for the line and drogue; and a controller for controlling the line and drogue in response to the command signals; and a supply aircraft comprising: an electrical cable comprising a first end for engagement with the drogue and a second end connected to the supply aircraft; and a communication unit configured to transmit the command signals, wherein: the controller is configured, in response to the deploy command signal, to deploy the line and drogue rearwardly to the supply aircraft behind the receiver aircraft; at least one of the supply aircraft and the drogue is controllable to engage the drogue with the first end of the electrical cable; and the controller is configured, in response to the return command signal, to return the line and drogue to the receiver aircraft with the first end of the electrical cable.

The supply aircraft may comprise a fuel hose comprising a first end for engagement with the drogue and a second end connected to the supply aircraft; and the receiver aircraft may comprise a fuel inlet for connection with the first end of the fuel hose.

The supply aircraft is behind the receiver aircraft during charging operations. This avoids the risk of wake turbulence (i.e. generated by the supply aircraft) for the receiver aircraft and its passengers. The supply aircraft may be directly behind the receiver aircraft, i.e. such there is a longitudinal separation between the nose of the supply aircraft and the tail of the receiver aircraft but no lateral separation between the noses of the two aircraft. Or the supply aircraft may be behind and offset from the receiver aircraft, i.e. such that there is a longitudinal separation between the nose of the supply aircraft and the tail of the receiver aircraft and also a lateral separation between the noses of the two aircraft.

The supply aircraft may be located below the receiver aircraft such that there is a height separation between the supply aircraft and the receiver aircraft, i.e. the supply aircraft is at a lower altitude than the receiver aircraft. Or the supply aircraft may be located at the same altitude as the receiver aircraft, i.e. such that there is no height separation between the supply aircraft and the receiver aircraft. Or the supply aircraft may be located above the receiver aircraft such that there is a height separation between the supply aircraft and the receiver aircraft, i.e. the supply aircraft is at a higher altitude than the receiver aircraft.

The height of the supply aircraft relative to the receiver aircraft may be changed while electrical energy is being transferred from the supply aircraft to the receiver aircraft. For example the supply aircraft may initially be at a lower altitude than the receiver aircraft but may move to be at the same altitude or a higher altitude than the receiver aircraft. Or the supply aircraft may initially be at the same altitude as the receiver aircraft but may move to be at a higher or lower altitude than the receiver aircraft. Or the supply aircraft may initially be at a higher altitude than the receiver aircraft but may move to be at the same altitude or a lower altitude than the receiver aircraft.

The invention offers numerous benefits, as follows.

The deployment of the line and drogue from the receiver aircraft, engagement of the electrical power cable with the drogue, and attachment of the electrical power cable to the receiver aircraft, are all controlled by the crew of the supply aircraft who possess the specialist skills needed for these operations. There is therefore no requirement for the commercial crew of the receiver aircraft to be specially trained, either in terms of flying in formation or in handling the electrical charging system.

Furthermore the electrical power cable and associated components, which are the parts of the system that are likely to be subject to the most stringent certification requirements, are comprised by the supply aircraft, while the receiver aircraft is only required to be fitted with minimal equipment, i.e. the line and drogue, communication unit, and control unit. This minimises costs for airlines, which may operate large fleets of receiver aircraft. The parts of the system which are fitted to the receiver aircraft do not carry any inherent fire risk, which will allay safety concerns for the airlines.

The charging system can be accounted for in the design of new receiver and supply aircraft. Advantageously a receiver aircraft can be "retrofitted" with the relevant components of the charging system. It is envisaged that these components can be conveniently provided in a self-contained unit having standard dimensions of common unit load devices (ULDs), e.g. LD3, that will fit in the rear cargo bay of a receiver aircraft. Similarly an existing supply aircraft may be retrofitted with the electrical power cable and electrical power plug.

Thus the invention enables safe and practicable in-flight (re)charging of aircraft, including civil aircraft.

BRIEF DESCRIPTION OF THE DRAWINGS

Examples will now be described with reference to the accompanying FIGS. 1 to 9, which illustrate an in-flight (re)charging operation.

DETAILED DISCUSSION

Figure 3:
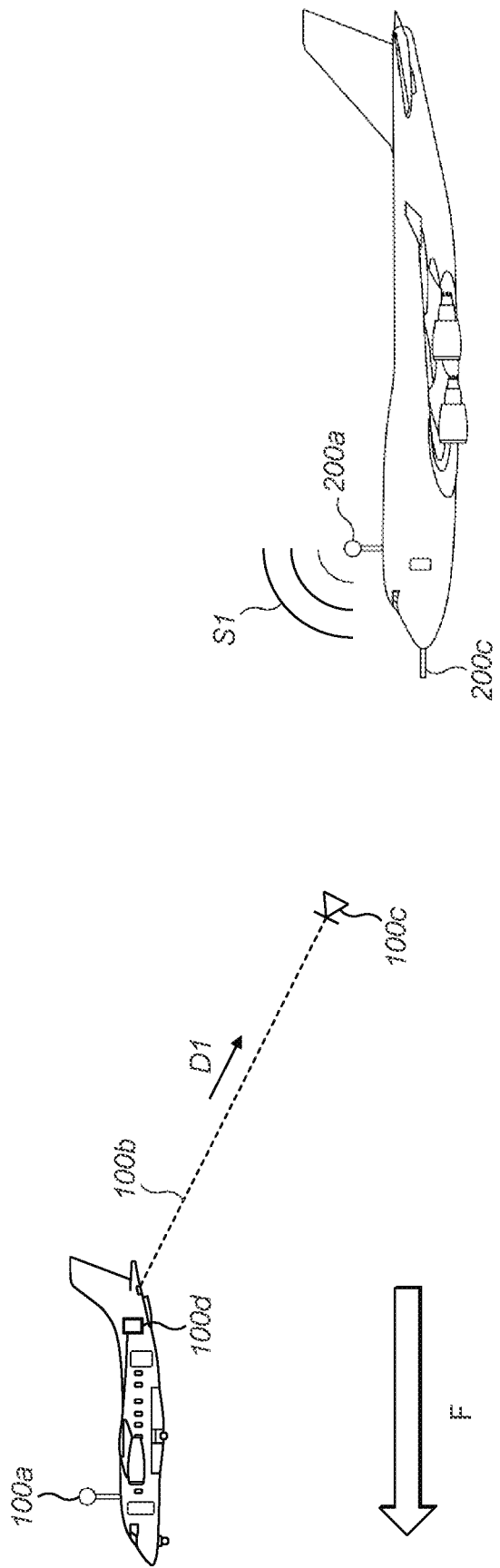

FIG. 1 shows a receiver aircraft 100, which is a commercial airliner. The receiver aircraft 100 is flying straight and level in a forward direction F at a constant speed. In other words, the receiver aircraft 100 is being flown at a steady cruise.

The receiver aircraft 100 comprises a communication unit (e.g. including an antenna) 100a. The receiver aircraft 100 further comprises a cable drum unit (not shown in the Figures) which is located in the tail section of the aircraft 100. In this example the drum is a motorised, multi-speed, geared drum which is articulated such that it can be disposed in any orientation relative to the direction of travel of the receiver aircraft 100. The cable drum unit houses a cable 100b (not shown in FIG. 1) which is wound around the drum, one end of the cable 100b being fixedly attached to the drum. In this example the cable 100b is constructed from steel. Alternatively the cable 100b may be constructed from some other material having high tensile strength and flexibility, e.g. carbon fibre composite. The other end (or free end) of the cable 100b is fixedly attached to a drogue 100c (not shown in FIG. 1). In this example the structure of the drogue 100c is collapsible for convenient storage in the tail section of the receiver aircraft 100. The receiver aircraft 100 further comprises a control unit 100d which is configured to operably control the cable drum unit and thereby the cable 100b and the drogue 100c. The receiver aircraft 100 further comprises an electrical power socket, for receiving an electrical power plug as will be described later herein, the electrical power socket being connected to an electrical power storage system of the receiver aircraft 100 via insulated electrical power cables (none of these elements being shown in the Figures). In this example the electrical power storage system of the receiver aircraft 100 comprises a plurality of batteries.

Still referring to FIG. 1, a supply aircraft configured to supply electrical energy, which in this example is a converted commercial airliner, hereinafter supply aircraft 200, is located behind and below the receiver aircraft 100. The supply aircraft 200 is approaching the receiver aircraft 100 in a level climb.

The supply aircraft 200 comprises a communication unit (e.g. including an antenna) 200a. The supply aircraft 200 further comprises an electrical power cable drum unit (not shown in the Figures) which is located in the nose section of the aircraft 200. In this example the drum is a motorised, multi-speed, geared drum. The electrical power cable drum unit houses an electrical power cable 200b (not shown in FIG. 1) which is wound around the drum, one end of the electrical power cable 200b being fixedly attached to the drum. The electrical power cable 200b comprises a conductive core material generally covered by an outer insulating material. In this example the conductive core material is constructed from copper and the outer insulating material is constructed from rubber. The other end of the electrical power cable 200b is fixedly attached to the rearward end of an elongate electrical power plug 200c. The electrical power plug 200c projects forwardly from the nose of the supply aircraft 200 and is configured to be detachable therefrom. The electrical power plug 200c comprises a conductive material generally covered by an outer protective material. In this example the conductive material comprises copper and the outer protective material comprises carbon fibre. In this example the electrical power plug 200c is configured to be received by the electrical power socket of the receiver aircraft, such as to provide a direct connection between the electrical power plug 200c and the electrical power socket. The supply aircraft 200 further comprises a control unit 200d which is configured to operably control the electrical power cable drum unit and thereby the electrical power cable 200b. The supply aircraft 200 further comprises electrical energy storage devices, e.g. batteries (these not being shown in the Figures).

Referring now to FIG. 2, the supply aircraft 200 has taken up position behind and below the receiver aircraft 100. In this position the supply aircraft 200 is flying straight and level in the forward direction F at a constant speed. The forward speed of the supply aircraft 200 is being controlled to be substantially the same as the forward speed of the receiver aircraft 100. Furthermore the supply aircraft 200 is being controlled to remain at a constant lateral- and height-separation from the receiver aircraft 100. That is, the supply aircraft 200 is being controlled to remain in a fixed position relative to the receiver aircraft 100. Thus the supply aircraft 200 and the receiver aircraft 100 are flying in formation with each other. With the flight formation established, an in-flight (re)charging operation is carried out, as follows.

Turning to FIG. 3, a first command signal S1 is sent by the communication unit 200a of the supply aircraft 200. The first command signal S1 is received by the communication unit 100a of the receiver aircraft 100 and is processed by the control unit 100d thereof. In response to the first command signal S1 the control unit 100d controls the cable drum unit to deploy the cable 100b and drogue 100c from the receiver aircraft 100. As can been seen from FIG. 3, the cable 100b and drogue 100c are deployed rearwardly of the receiver aircraft 100 in a first direction D1. In this example the cable 100b is unwound slowly from the drum in low gear initially, as the drogue 100c emerges from the receiver aircraft 100, then more quickly in high gear as the drogue 100c moves further away from the receiver aircraft 100. Low gear is then used again for fine control as the drogue 100c approaches the supply aircraft 200. During deployment of the cable 100b and drogue 100c the receiver aircraft 100 and the supply aircraft 200 remain in formation at constant speed in straight and level flight in the forward direction F.

Figure 4:
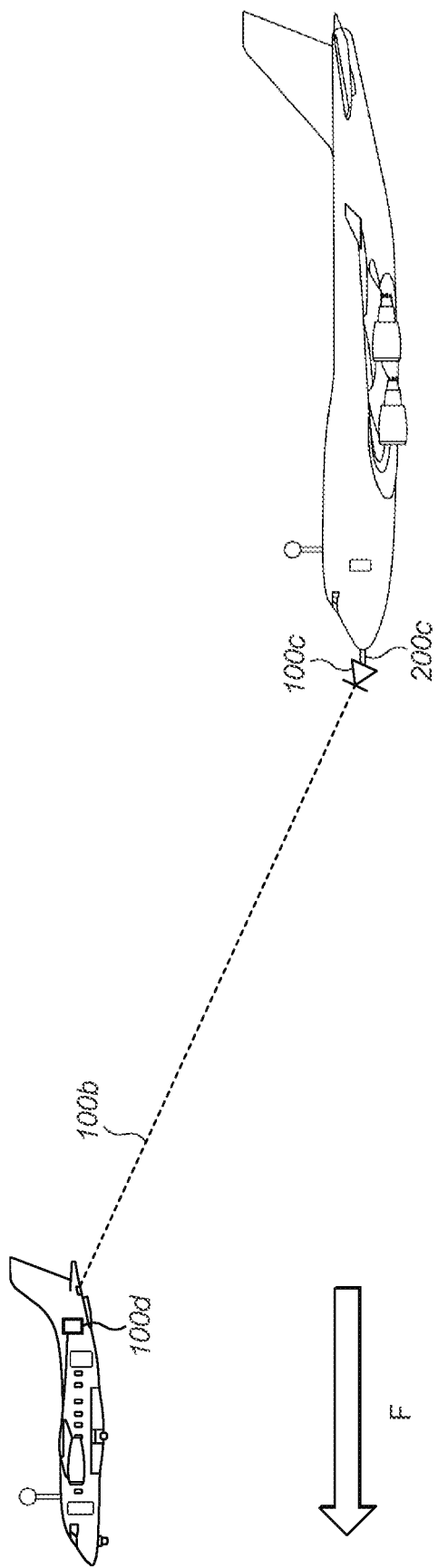

Referring next to FIG. 4, the cable 100b is extended sufficiently so that the drogue 100c is close to the nose of the supply aircraft 200 and the electrical power plug 200c which extends therefrom. The supply aircraft 200 is flown (e.g. accelerated) toward the drogue 100c in order for the electrical power plug 200c to engage the drogue 100c. Specifically the supply aircraft 200 is manoeuvred so that the electrical power plug 200c enters the rearward end of the funnel-shaped drogue 100c and is passed through a central aperture of the drogue 100c so as to project outwardly from the forward end of the drogue 100c. Once the drogue 100c is positioned over the electrical power plug 200c in this way the drogue 100c is fixedly coupled to the electrical power plug 200c. In this example the coupling is by means of self-actuating mechanical clamps, which are comprised by one or both of the drogue 100c and the electrical power plug 200c and are activated to close by the forward passage of the electrical power plug 200c through the drogue 100c.

In this coupled condition the supply aircraft 200 is tethered to the receiver aircraft 100 by the cable 100b and drogue 100c. The supply aircraft 200 is again controlled to remain in a fixed position (i.e. with regard to lateral- and height-separation) relative to the receiver aircraft 100, such that the two aircraft are flying in formation with each other. The control unit 100d is operable to control the drum of the cable drum unit in order to maintain tension in the cable 100b, so as to mitigate any turbulence which might cause the receiver aircraft 100 and the supply aircraft 200 to move relative to each other momentarily.

Figure 5:
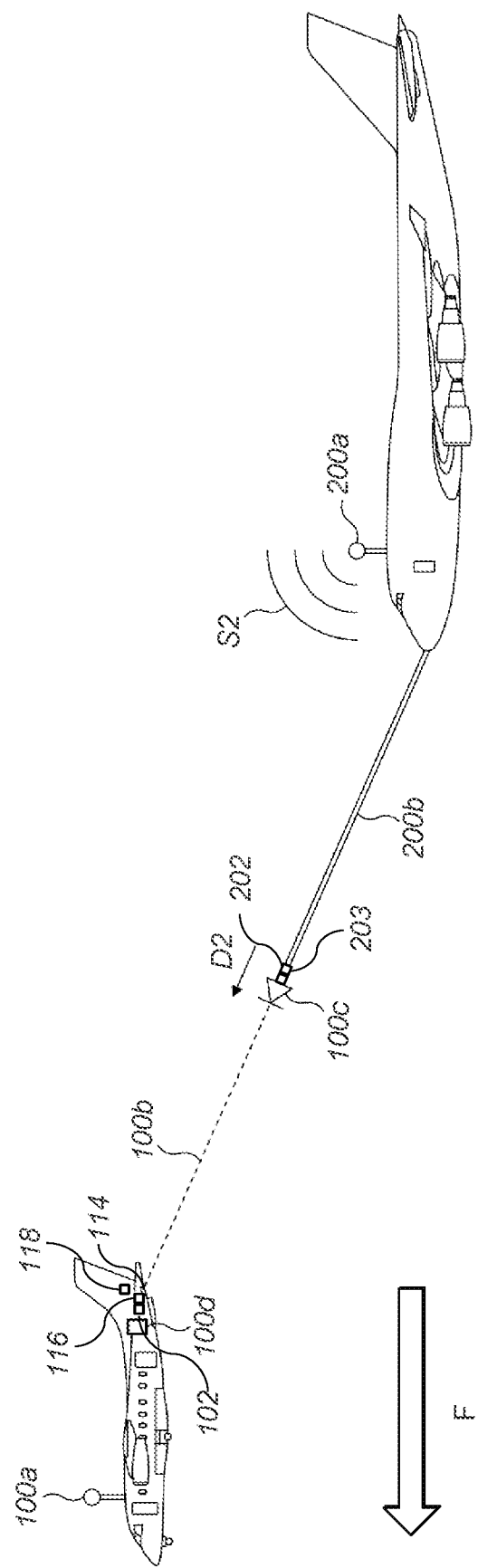

Referring now to FIG. 5, a second command signal S2 is sent by the communication unit 200a of the supply aircraft 200. The second command signal S2 is received by the communication unit 100a of the receiver aircraft 100 and is processed by the control unit 100d thereof. In response to the second command signal S2 the control unit 100d controls (i.e. reverses) the cable drum unit to retract the cable 100b and drogue 100c back toward the receiver aircraft 100, in a second direction D2 which is opposite to the first direction D1.

The tensile (pulling) force on the cable 100b causes the electrical power plug 200c (which is coupled to the drogue 100c) to detach from the nose of the supply aircraft 200. The electrical power cable 200b, which is attached to the rearward end of the electrical power plug 200c, is thus drawn from the nose of the supply aircraft 200. As the cable 100b is wound on the drum of the cable drum unit of the receiver aircraft 100, the electrical power cable 200b is expelled from the electrical power cable drum unit of the supply aircraft 200. In this example the control unit 200d of the supply aircraft 200 controls the electrical power cable drum unit to assist in the deployment of the electrical power cable 200b. Therefore in this example the electrical power cable 200b is extended and the cable 100b is retracted by the simultaneous actions of the electrical power cable drum unit of the supply aircraft 200 and the cable drum unit of the receiver aircraft 100. Alternatively the electrical power cable drum unit may be allowed to "freewheel" so that the electrical power cable 200b is extended by just the action of the cable drum unit.

Thus the cable 100b, drogue 100c, electrical power plug 200c and electrical power cable 200b are drawn toward the receiver aircraft 100. During this operation the receiver aircraft 100 and the supply aircraft 200 remain in formation.

Figure 6:
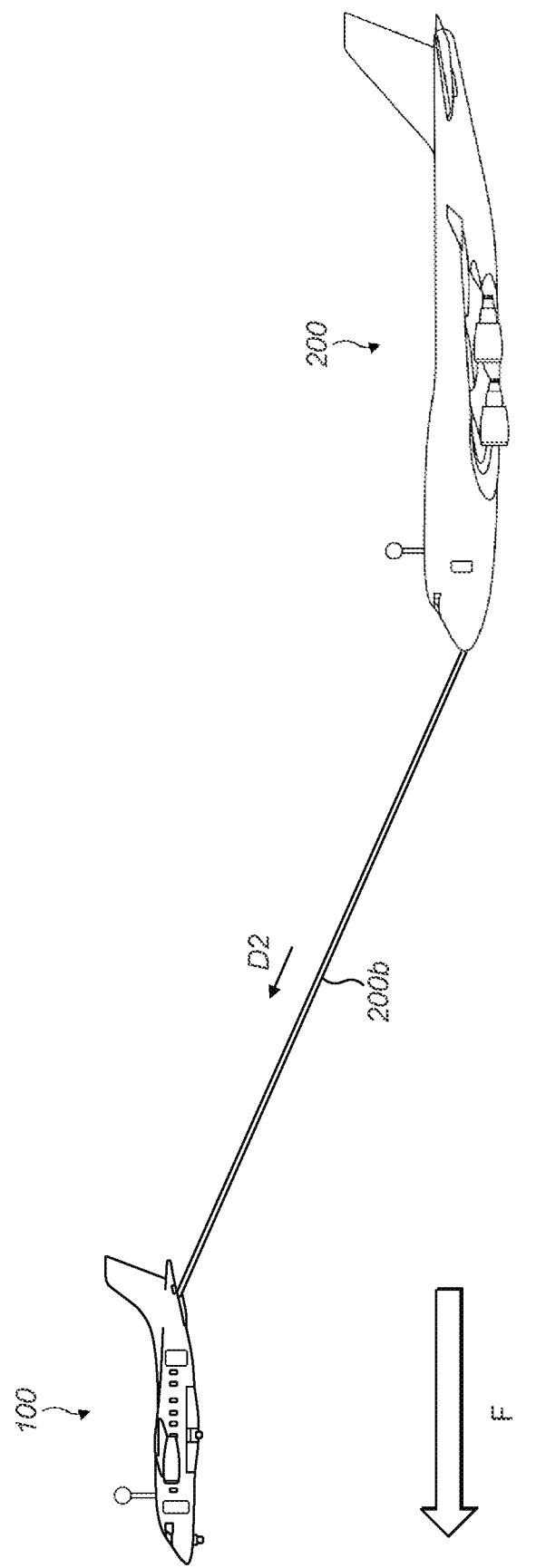

When the drogue 100c and electrical power plug 200c reach the receiver aircraft 100 the low gear of the cable drum unit is applied and the electrical power plug 200c is guided to the electrical power socket of the receiver aircraft 100. The electrical power socket receives the forward end of the electrical power plug 200c, which projects forwardly of the drogue 100c as described above. In this condition the electrical power cable 200b is extended the full distance between the supply aircraft 200 and the receiver aircraft 100, as shown in FIG. 6. The two aircraft 100, 200 remain in formation. A tensile (pulling) force, exerted on the cable 100b (and thereby on the drogue 100c) by the cable drum unit, holds the forward end of the electrical power plug 200c securely in the electrical power socket to facilitate transfer of electrical energy (or power). A latch mechanism may be provided to positively lock the electrical power plug 200c to the electrical power socket.

Recharging circuit switches of the supply aircraft 200 are activated, to transfer electrical energy from the electrical energy storage devices of the supply aircraft 200 to the electrical power storage system of the receiver aircraft 100 (i.e. in direction D2). The electrical power transfer is controlled by the crew of the supply aircraft 200, or remotely. One or more of the batteries of the (electrical power storage system of the) receiver aircraft 100 may draw power from the supply aircraft 200 via the electrical power cable 200b. A power distribution circuit of the receiver aircraft 100 may be controlled by the crew of the supply aircraft 200, for example via signals which are sent by the communication unit 200a of the supply aircraft 200 to the communication unit 100a of the receiver aircraft 100 and processed by the control unit 100d of the receiver aircraft 100.

The amount of electrical energy (or power) being transferred to the receiver aircraft 100 is monitored (and optionally recorded) by the crew of the supply aircraft 200. The crew of the receiver aircraft 100 may advise the crew of the supply aircraft 200 of the total amount of power required, for example by radio communication. Alternatively the crew of the supply aircraft 200 may be advised by a third party, for example an operator at a base of the airline which owns the receiver aircraft 100, of the total amount of power to be transferred, or the entire operation may be controlled remotely. The total amount of power to be transferred may be predetermined. The amount of power transferred may be recorded using ammeters or wattmeters on the receiver aircraft 100, which may be remotely interrogated at a later time.

When the required amount of power has been transferred, the recharging circuit switches of the supply aircraft 200 are deactivated (along with the power distribution circuit of the receiver aircraft 100, if being used) so that power flow through the electrical power cable 200b ceases.

Figure 7:
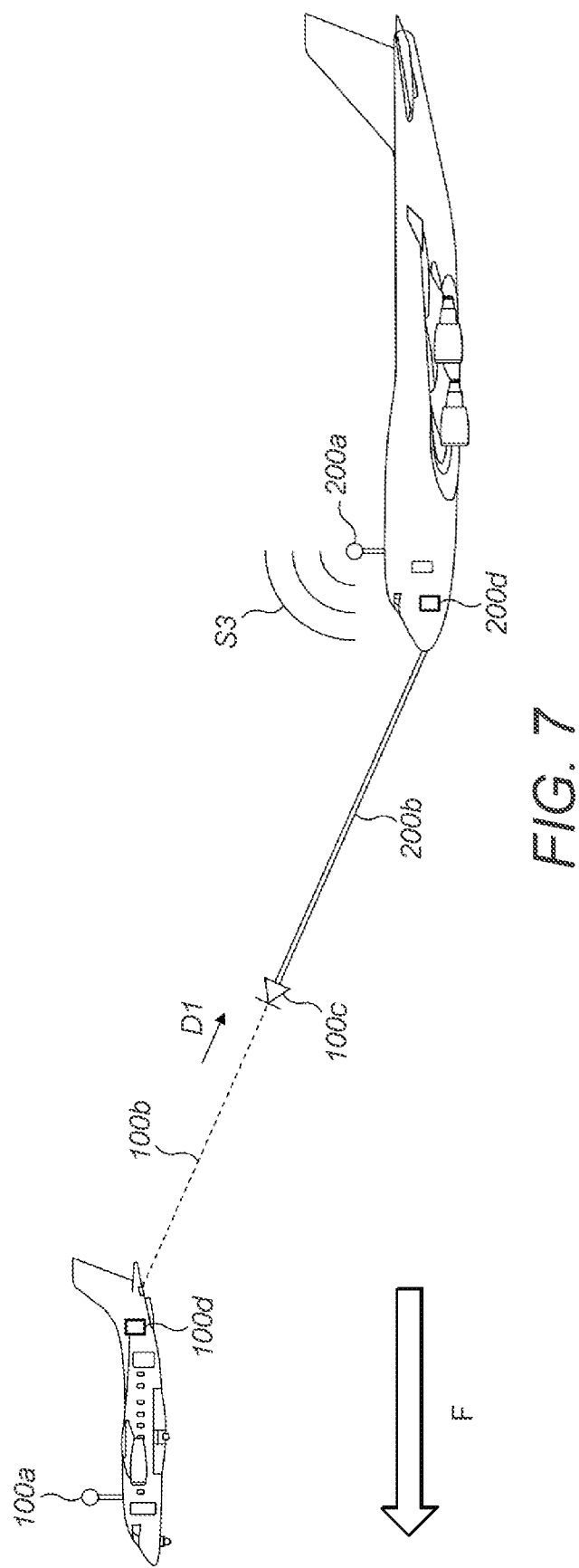

Referring next to FIG. 7, a third command signal S3 is sent by the communication unit 200a of the supply aircraft 200. The third command signal S3 is received by the communication unit 100a of the receiver aircraft 100 and is processed by the control unit 100d thereof. In response to the third command signal S3 the control unit 100d controls the cable drum unit to deploy the cable 100b and drogue 100c, and thereby the electrical power plug 200c which is still coupled to the drogue 100c. Furthermore the control unit 200d of the supply aircraft 200 controls the electrical power cable drum unit to retract the electrical power cable 200b. Therefore the cable 100b is extended and the electrical power cable is 200b is retracted by the simultaneous actions of the cable drum unit of the receiver aircraft 100 and the electrical power cable drum unit of the supply aircraft 200. Thus the cable 100b and drogue 100c, electrical power plug 200c and electrical power cable 200b are moved in the first direction D1 toward the supply aircraft 200. Alternatively the cable drum unit may be allowed to "freewheel" so that the cable 100b is extended by just the action of the electrical power cable drum unit. During this operation the receiver aircraft 100 and the supply aircraft 200 remain in formation.

Figure 8:
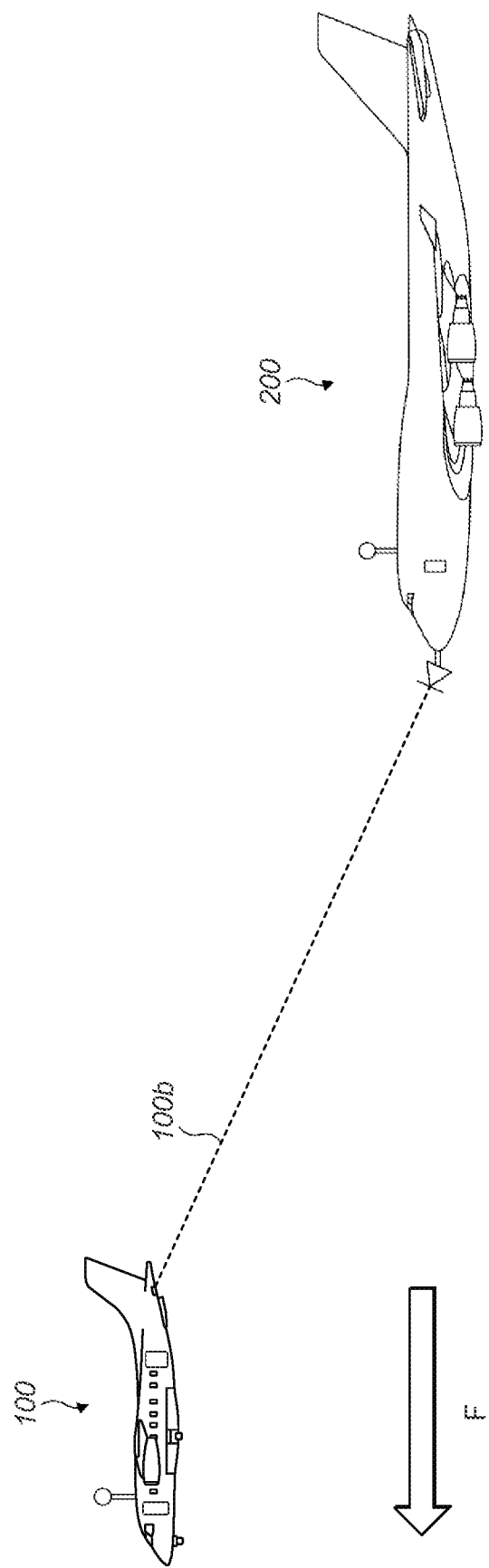

When the drogue 100c and electrical power plug 200c reach the supply aircraft 200 the electrical power plug 200c is drawn (by the electrical power cable drum unit) back into the nose of the supply aircraft 200 so as to be reattached thereto. As the electrical power plug 200c is drawn into the nose of the supply aircraft 200 the self-actuating mechanical clamps are released to decouple the drogue 100c from the electrical power plug 200c. In this condition the cable 100b is extended the full distance between the receiver aircraft 100 and the supply aircraft 200, as shown in FIG. 8. The two aircraft 100, 200 remain in formation.

Figure 9:
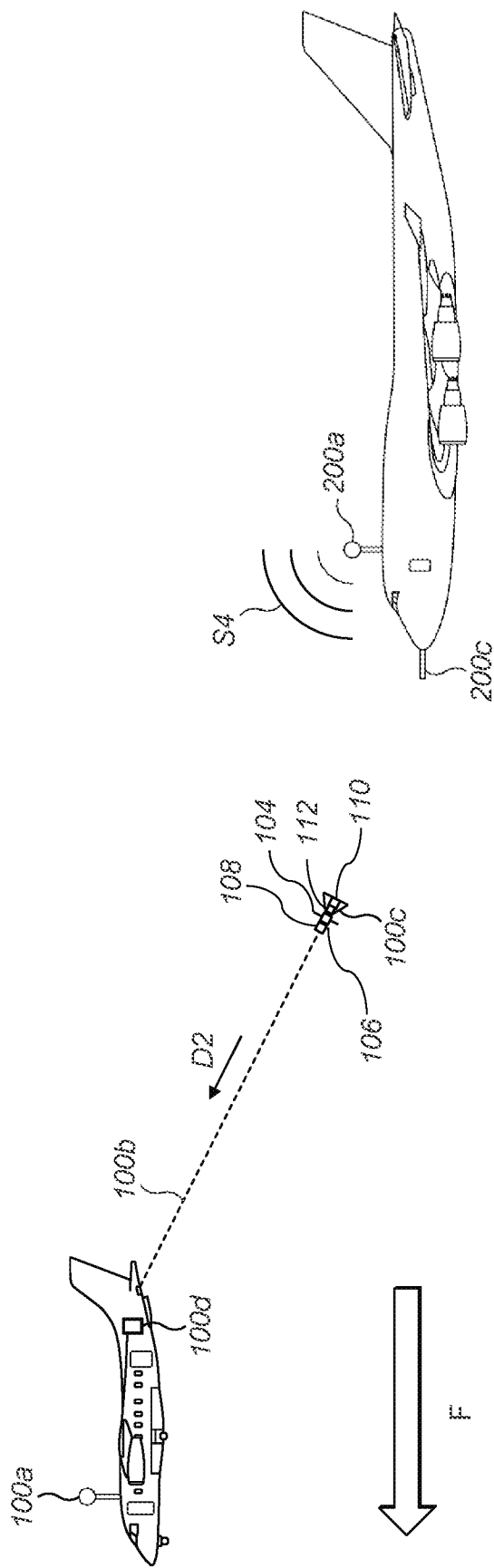

Referring now to FIG. 9, a fourth command signal S4 is sent by the communication unit 200a of the supply aircraft 200. The fourth command signal S4 is received by the communication unit 100a of the receiver aircraft 100 and is processed by the control unit 100d thereof. In response to the fourth command signal S4 the control unit 100d controls (i.e. reverses) the cable drum unit to retract the cable 100b and drogue 100c back toward the receiver aircraft 100 in the second direction D2. The cable 100b is wound on the drum in low gear initially. The tensile (pulling) force on the cable 100b causes the drogue 100c to pass forwardly along the fixed electrical power plug 200c so as to separate from the electrical power plug 200c. In this separated condition the supply aircraft 200 is untethered from the receiver aircraft 100 and is free to break formation. The cable 100b is wound on the drum in high gear to draw the drogue 100c toward the receiver aircraft 100. Low gear is then used again for fine control as the drogue 100c approaches the receiver aircraft 100. The cable 100b is fully retracted so that the cable 100b is stored by the cable drum unit and the drogue 100c is stored in the tail section of the receiver aircraft 100. During retraction of the cable 100b and drogue 100c the receiver aircraft 100 preferably remains at constant speed in straight and level flight in the forward direction F.

In the above-described example the receiver aircraft 100 and the supply aircraft 200 are flown manually by their respective pilots. Alternatively, the speed and direction of one or both of the receiver aircraft 100 and the supply aircraft 200 may be controlled automatically, for example by autopilot, or remotely from a control station in the case of an unmanned aircraft. The formation speed and direction (ground track) of the receiver aircraft 100 and the supply aircraft 200 may be predetermined by the crew of the supply aircraft 200, such as to be optimal for in-flight recharging operations.

Also in the above-described example the supply aircraft 200 is manoeuvred (flown) toward the drogue 100c in order for the electrical power plug 200c to engage the drogue 100c. Alternatively (or additionally) the drogue 100c may be configured to be controllable by the supply aircraft 200 in flight to engage the electrical power plug 200c. In such an example the drogue 100c comprises aerodynamic control surfaces 104 which are adjustable in order to controllably alter the position and/or orientation of the drogue 100c in flight, thereby to guide the drogue 100c to engage with the electrical power plug 200c.

For example the drogue 100c may comprise a plurality of stabilising fins and the control surfaces may comprise deflectable trailing edges of the fins. The cable 100b may comprise a conductive material so that electrical power may be provided to the control surfaces by the receiver aircraft 100 via the cable 100b. Alternatively the drogue 100c may comprise an air-driven generator or other dedicated power source 108 for providing electrical power to the control surfaces.

The drogue 100c may comprise a communication unit 106 for receiving control signals for the control surfaces directly from the communication unit 200a of the supply aircraft 200. Alternatively control signals, for adjusting the control surfaces, may be sent from the communication unit 200a of the supply aircraft 200 to the communication unit 100a of the receiver aircraft 100, processed by the control unit 100d of the receiver aircraft 100, and sent to the control surfaces 104 of the drogue 100c via the cable 100b.

The fins may comprise rounded leading edges comprising a shock-resistant material to minimise risk of damage to the receiver aircraft 100 or the supply aircraft 200 during deployment.

The drogue 100c may comprise radar transponders, and the supply aircraft 200 may comprise a close-range radar system, for assisting low-visibility acquisition and engagement of the drogue 100c by the electrical power plug 200c of the supply aircraft 200. The drogue 100c may comprise differently coloured lights to aid visual manoeuvring of the drogue 100c in low-visibility conditions.

In another example the electrical power plug 200c (or the free end of the electrical power cable 200b) is configured to be steerable, by the crew of the supply aircraft 200, to engage with the drogue.

In an example, the electrical power cable drum unit is mounted on rails, or the like, so as to be movable (e.g. using a motor) relative to the housing (or other platform) of the charging system in the receiver aircraft 100. Thus the electrical power cable drum unit can be translated toward or away from the receiver aircraft 100 in flight. This provides an alternative (or additional) means of managing the tension in the electrical power cable 200b of the supply aircraft while the electrical power cable 200b is connected to the power socket in the receiver aircraft 100. In this example the electrical power cable drum unit comprises a short, flexible (or telescopic) power supply cable to allow translational movement of the electrical power cable drum unit.

In the event of a catastrophic rupture of the electrical power cable 200b during charging, an electrical power cable 200b jettison sequence may be initiated, by either the crew of the receiver aircraft 100 or the crew of the supply aircraft 200, which will minimise the risk of collision between the electrical power cable 200b and the supply aircraft 200. Jettisoning should preferably commence at the receiver aircraft 100 end, either by releasing the electrical power plug 200c from the drogue 100c or by guillotining the electrical power cable 200b. A chute may be rapidly deployed (for example using an explosive charge, similar to that used in vehicle airbags) which at high speed will drag the distal end of the electrical power cable 200b away from the receiver aircraft 100. Immediately after this sequence, a similar chute may be deployed at the other end of the electrical power cable 200b proximate to the supply aircraft 200. At the supply aircraft 200 end the electrical power cable 200b is directed by the chute to be jettisoned upwards, such that the deployed chute drags the electrical power cable 200b away from the supply aircraft 200 and particularly its wings, engines and tail. The electrical power cable 200b may include a transponder which can be activated to allow recovery. This is useful since recharging operations will normally be carried out over water or sparsely populated areas. The electrical power cable 200b may include a flotation device to aid recovery from water.

Other safety features may be provided, as follows. A fire suppression system may be integrated into one or both of the receiver aircraft 100 and the supply aircraft 200. Fuses may be provided in the electrical power cable 200b, such that a sudden increase in current will automatically cause charging to cease. The electrical power cable 200b may comprise lightning-diffusion means, for example a conductive mesh disposed at or under the surface of the electrical power cable 200b, for dissipating a lightning strike.

It will be understood that the invention has been described in relation to preferred examples and may be modified in many different ways without departing from the scope of the invention as defined by the accompanying claims.

In an example the electrical power plug 200c is located on the supply aircraft 200 at a position other than the nose, for example above the cockpit or at a forward position on a side of the fuselage. In such an example the electrical power cable drum unit is appropriately located in the supply aircraft 200 in the vicinity of the electrical power plug 200c.

In an example the electrical power plug 200c of the supply aircraft 200 is omitted. In this case the free end of the electrical power cable 200b projects from the nose of the supply aircraft 200, and is engaged by the drogue 100c and by the electrical power socket of the receiver aircraft 100.

In the above-described example a direct electrical connection is provided, between the electrical power plug 200c (male connector) of the supply aircraft 200 and the electrical power socket 114 (female connector) of the receiver aircraft 100, for the purpose of recharging. In another example, a direct electrical connection is provided between an electrical power socket (female connector) of the supply aircraft 200 and an electrical power plug (male connector) of the receiver aircraft 100.

In another example shown in FIG. 5, each one of the first end of the electrical power cable 200b and a receptacle 114 of the receiver aircraft 100 comprises a sealed inductive coil 102, 202, such as to provide an inductive (indirect) electrical coupling between the supply aircraft 200 and the receiver aircraft 100, for the purpose of recharging. An inductive coupling removes the need for a direct connection or coupling between a plug and socket, which can be a complex manoeuvre. Close proximity is sufficient for charging to take place and resonant coupling can be used to optimise the rate of power transfer. Advantages of this method are the avoidance of the indirect or autonomous manoeuvring of a plug device into close contact with a socket device, and safety, as the interaction between the two induction coils minimises any risk of sparks or other risk that could give rise to a source of ignition. In addition, because the charging can take place through close proximity, the charging may take place through the outer skin of the receiver aircraft 100, minimising structural changes and keeping the activity external to the aircraft, thus maximising its integrity.

In an example, the first end of the electrical power cable 200b comprises a magnetic device 203 for attracting the electrical connector (plug/socket) or inductive coil to the electrical connector 114 (plug/socket) or inductive coil 116 of the receiver aircraft by magnetic force, thereby guiding the first end of the electrical power cable 200b to make the (direct or indirect) connection with the receiver aircraft 100. The magnetic device 203 may comprise an electromagnetic device which is controllable by the communication and control system of the supply aircraft 200. Alternatively or additionally, the electrical connector 114 may comprise a second magnetic device 102 for attracting the electrical connector 200c or inductive coil 116 of the electrical cable 200b of the supply aircraft 200 thereto by magnetic force.

In an example shown in FIG. 9, the receiver aircraft 100 may comprise a fuel inlet 118 for connection with an end of a fuel hose of the supply aircraft 200.

With regard to all the examples of the invention, the command signals, which are sent by the communication unit 200a of the supply aircraft 200 to the communication unit 100a of the receiver aircraft 100, may be transmitted and processed sequentially. Alternatively two or more (optionally all) of the signals may be transmitted simultaneously and processed sequentially. The control unit 100d of the receiver aircraft 100 may be pre-programmed to perform the sequential processing upon receipt of the simultaneously-transmitted signals.

Various kinds of line other than a cable are envisaged for use with the drogue, for example wire, cord, rope, chain, or the like, and all of these are within the scope of the claimed invention.

In an example shown in FIG. 9, the drogue 100c comprises a magnetic device 110 for attracting the first end of the electrical power cable 200b to the drogue 100c by magnetic force, thereby guiding the first end of the electrical power cable 200b to the drogue 100c. The magnetic device 110 may comprise an electromagnetic device which is controllable by the communication and control system of the supply aircraft 200. The drogue 100c may further comprise a dedicated electrical power source 112 for powering the electromagnetic device.

In an example, once the electrical connection has been made between the supply aircraft 200 and the receiver aircraft 100, the horizontal (and optionally the vertical) distance between the two aircraft is increased, before (or while) the charging operation is carried out. For example, in order to extend the distance between the supply aircraft 200 and the receiver aircraft 100, the supply aircraft 200 may be slowly decelerated in order to extend the horizontal distance between the supply and receiver aircraft, until such time as the horizontal distance is optimal for recharging to commence. In this example the electrical power cable 200b is further expelled from the supply aircraft 200 by the operation of the drum unit, preferably maintaining constant tension in the electrical power cable 200b. (In the case of a hybrid system, the fuel hose is similarly further expelled from the supply aircraft 200). When the supply aircraft 200 is at the optimal horizontal distance from the receiver aircraft 100, the supply aircraft 200 is accelerated so as to be at the same constant speed as the receiver aircraft 100. Thus the two aircraft will be flown in formation. The charging operation is performed while the two aircraft are established in formation and at the increased horizontal distance from each other.

Once charging is completed, the supply aircraft 200 is accelerated so as to reduce the horizontal distance to the receiver aircraft 100. As the supply aircraft 200 approaches the receiver aircraft 100, the electrical power cable 200b (and the fuel hose, if used) is retracted to the supply aircraft 200 to take up the slack. When the supply aircraft 200 is at the desired horizontal distance from the receiver aircraft 100, the supply aircraft 200 is decelerated so as to be at the same constant speed as the receiver aircraft 100. The line and drogue 100c and first end of the electrical power cable 200b are then returned to the supply aircraft 200, in the manner described above.

This may be a more efficient mode of operation than the line and drogue 100c dragging a very long and heavy cable/hose against wind drag towards the receiver aircraft 100, which would require a much heavier/stronger and longer line being on the cable drum in the receiver aircraft 100. It is assumed that the tensile strength of the electrical power cable/fuel hose is greater than that of the line and drogue 100c. The supply aircraft 200 therefore retires back to the safe operating distance from the receiver aircraft 100.

The invention provides benefits to several parties, but primarily aircraft manufacturers and commercial aircraft operators, e.g. airlines, as follows.

Studies have demonstrated the fuel savings of in-flight refueling (IFR) of commercial aircraft to be in the order of 11-23%, net of fueling the delivery of the fuel via the supply aircraft. Since fuel is a very significant operating cost (IATA estimates the global airline industry's fuel bill in 2018 to be $188 billion), the opportunity to make savings of this magnitude are revolutionary (normally a 2% fuel saving through engine efficiency is seen as a major improvement). These fuel savings would have a material impact on the profitability of an airline and, in the longer term, the whole industry. In the case of electrically-powered or hybrid-power aircraft (i.e. aircraft configured to be selectively powered by electricity and liquid fuel), the savings from recharging in flight are anticipated to be of a similar magnitude.

Providing in flight recharging capability to electrically-powered or hybrid-power aircraft would also have the following benefits:

Reduced take-off weight through smaller power storage systems, leading to ability to use shorter runways which would open up access to new destination airports that currently do not have the length of runway required.

Reduced thrust required on take-off due to reduced weight, so delivering environmental benefits in reduced noise.

Reduced landing charges, with less frequent recharging stops and reduced environmental impact.

Fewer landings and take-offs could be expected to lengthen the operational life of landing gear, tyres and aircraft structure, offering better asset utilisation over time.

Capacity constraints at airports could be alleviated because although the overall capacity of the aviation industry would grow, the utilisation of airports would be proportionately lower.

With extended range of aircraft fleet fitted with in-flight recharging capability, a wider range of destinations and therefore better capacity utilisation and market opportunity will exist. Sustainable competitive advantage can be established for airlines with in-flight recharging versus those without. Revenue enhancement can be achieved with premium customers prepared to pay for shorter flight time to popular business destinations, none of which would be out of range with in-flight recharging, although dependent on other limiting factors (e.g. staff, consumables, passenger comfort, etc). Part of the time and fuel savings would come from direct flight paths, not requiring diversion from optimal path for landing and recharging as well as the actual time and cost of landing, recharging on the ground and take off.

In the longer term, the design of aircraft may be adapted, with the trade-off of smaller power storage systems and weight required, against more fee-paying passengers, more cargo, or other added-value services that can optimise the revenue yield for the airline.

Electrical energy supply services may be provided in different high density flight locations, optimising the location relative to the profile of flights passing nearby. Supply aircraft would provide scheduled fuel transfer services in defined air corridor service areas ("Power Stations in the Sky" or "Power Ferries"), served from nearby airfields that might specialise in supply operations only. The possibility of supply aircraft providing electrical energy to commercial receivers from astern, and to military receivers from a forward position, offers the opportunity of dual-function supply aircraft, offering both power recharging and refueling capability, which would be able to service both commercial aircraft (as described herein) and military aircraft (by established probe and drogue or flying boom methods).

The opportunity to "retrofit" in-flight recharging capability to existing fleets (circa 20,000 operating aircraft in the non-military sectors) offers an additional revenue opportunity from the in-flight recharging equipment, installation and after-sales services. Because the in-flight recharging equipment can be retrofitted via a standard size cargo ULD unit, which fits into a wide range of aircraft manufacturers' aircraft, the opportunity exists for one manufacturer to capture this market across competitors' aircraft as well as their own. A revenue opportunity exists to share in the material savings that airlines would achieve.

In the longer term aircraft designs can be changed to take account of the need to carry less power storage capability, even for long-haul flights. This will give greater flexibility to introduce capacity for more fee paying passengers or value-added services that can increase revenue opportunity and therefore revenue yield. Aircraft designs using this in-flight recharging technology would have materially greater power efficiency and therefore sustainable competitive advantage would accrue to adopters. Environmental benefits would be competitive advantages in an increasingly environmentally sensitive marketplace.

New supply aircraft designs or adaptations of existing supply aircraft fleets could provide both services via this novel in-flight recharging technology to commercial aircraft, both passenger and cargo, but also via existing drogue and probe and flying boom methods, to military aircraft. Supply aircraft could also have hybrid refueling and recharging capability. This would offer competitive advantage to the aircraft manufacturer though the ability of customers to defray costs across both segments and leasing of aircraft with dual function, optimising asset utilisation and materially reducing costs of the capability for both users.

While the invention has been described generally in the context of civil or commercial aircraft operations, it will be understood that the invention is applicable to aircraft of various types in both civil and military contexts. For example, the invention may be used in connection with fixed-wing and rotary wing aircraft (e.g. helicopters) and manned and unmanned aircraft (e.g. drones).

The invention claimed is:

1. A system for a supply aircraft for in-flight recharging, comprising:
   an electrical cable comprising a first end for engagement with a drogue of a line and drogue of a receiver aircraft and a second end for connection to the supply aircraft;
   a communication unit configured to transmit command signals to a communication unit of the receiver aircraft;
   an electrical power cable drum unit; and
   a control unit of the supply aircraft, for controlling the electrical power cable drum unit of the supply aircraft and a cable drum unit of the receiver aircraft such that the line and drogue are returned and the electrical cable is deployed by simultaneous actions of the electrical power cable drum unit and the cable drum unit,
   wherein the command signals comprise:
      a deploy command signal, for causing the receiver aircraft to deploy the line and drogue rearwardly to the supply aircraft behind the receiver aircraft to enable the drogue to be engaged with the first end of the electrical cable; and
      a return command signal, for causing the line and drogue to return to the receiver aircraft with the first end of the electrical cable, the returning of the line and drogue to the receiver aircraft causing the electrical cable to be deployed from the supply aircraft.

2. The system of claim 1, wherein the first end of the electrical cable comprises an electrical connector for direct coupling with an electrical connector of the receiver aircraft.

3. The system of claim 1, wherein the first end of the electrical cable comprises an inductive coil for inductive coupling with an inductive coil of the receiver aircraft.

4. The system of claim 2, wherein the electrical connector of the first end of the electrical cable comprises a magnetic device for attracting the electrical connector/inductive coil of the receiver aircraft thereto by magnetic force.

5. The system of claim 4, wherein the magnetic device comprises an electromagnetic device.

6. The system of claim 1, further comprising a fuel hose comprising a first end for engagement with the drogue of the receiver aircraft and a second end for connection to the supply aircraft.

7. A system for a receiver aircraft for in-flight recharging, comprising:
   a line and drogue for engagement with a first end of an electrical cable of a supply aircraft, a second end of the electrical cable being connected to the supply aircraft;
   a communication unit configured to acquire, deploy, and return command signals from a communication unit of the supply aircraft;
   a cable drum unit; and
   a controller configured to:
      in response to the deploy command signal, deploy the line and drogue rearwardly to the supply aircraft behind the receiver aircraft to enable the drogue to be engaged with the first end of the electrical cable; and
      in response to the return command signal, return the line and drogue to the receiver aircraft with the first end of the electrical cable, the returning of the line and drogue to the receiver aircraft causing the electrical cable to be deployed from the supply aircraft such that:
         the line and drogue are returned, and
         the electrical cable is deployed by simultaneous actions of an electrical power cable drum unit on the supply aircraft and the cable drum unit.

8. The system of claim 7, wherein the drogue comprises adjustable aerodynamic control surfaces for guiding the drogue for engagement with the first end of the electrical cable in flight.

9. The system of claim 8, wherein the drogue further comprises a communication unit for receiving control signals from the communication unit of the supply aircraft for adjusting the aerodynamic control surfaces.

10. The system of claim 8, wherein the drogue further comprises a dedicated electrical power source for powering the adjustable aerodynamic control surfaces.

11. The system of claim 8, wherein the line comprises a conductive material for transmitting electrical power from the receiver aircraft to the drogue for powering the adjustable aerodynamic control surfaces.

12. The system of claim 7, wherein the drogue comprises a first magnetic device for attracting the first end of the electrical cable to the drogue by magnetic force.

13. The system of claim 12, wherein the first magnetic device comprises an electromagnetic device.

14. The system of claim 13, wherein the drogue further comprises a dedicated electrical power source for powering the electromagnetic device.

15. The system of claim 13, wherein the line comprises a conductive material for transmitting electrical power from the receiver aircraft to the drogue for powering the electromagnetic device.

16. The system of claim 7, further comprising an electrical connector for direct coupling with an electrical connector of the electrical cable of the supply aircraft.

17. The system of claim 7, further comprising an inductive coil for inductive coupling with an inductive coil of the electrical cable of the supply aircraft.

18. The system of claim 16, wherein the electrical connector of the system further comprises a second magnetic device for attracting the electrical connector/inductive coil of the electrical cable of the supply aircraft thereto by magnetic force.

19. The system of claim 18, wherein the second magnetic device comprises an electromagnetic device.

20. The system of claim 7, further comprising a fuel inlet for connection with an end of a fuel hose of the supply aircraft.

* * * * *